United States Patent
Pourchot et al.

(10) Patent No.: US 10,006,634 B2
(45) Date of Patent: Jun. 26, 2018

(54) COAL FIRED OXY PLANT WITH AIR SEPARATION UNIT INCLUDING PARALLEL COUPLED HEAT EXCHANGER

(71) Applicant: General Electric Technology GmbH, Baden (CH)

(72) Inventors: Thierry Pourchot, Naves Parmelan (FR); Francois Granier, Vetrigne (FR); Frederic Geiger, Giromagny (FR)

(73) Assignee: GENERAL ELECTRIC TECHNOLOGY GMBH, Baden (CH)

(*) Notice: Subject to any disclaimer, the term of this patent is extended or adjusted under 35 U.S.C. 154(b) by 137 days.

(21) Appl. No.: 14/707,744

(22) Filed: May 8, 2015

(65) Prior Publication Data
US 2015/0323180 A1    Nov. 12, 2015

(30) Foreign Application Priority Data
May 8, 2014   (EP) ..................................... 14290138

(51) Int. Cl.
*F01K 7/40* (2006.01)
*F01K 13/00* (2006.01)
(Continued)

(52) U.S. Cl.
CPC ................ *F23L 7/007* (2013.01); *F01K 7/40* (2013.01); *F01K 9/023* (2013.01); *F01K 13/00* (2013.01);
(Continued)

(58) Field of Classification Search
CPC ... B01D 2257/504; Y02E 20/14; Y02E 20/16; Y02E 20/34; Y02E 20/344; Y02C 10/06;
(Continued)

(56) References Cited

U.S. PATENT DOCUMENTS 2,921,441 A   1/1960  Buri
2,991,620 A   7/1961  Nekolny
(Continued)

FOREIGN PATENT DOCUMENTS

DE   10 2004 059 358 A1   6/2005
DE   10 2005 026 534 A1   12/2006
(Continued)

OTHER PUBLICATIONS

Beer S et al: "Massnahmen Zur Steigerung Des Netto-Wirkungsgrades an Einem Bestehenden 300-MW-Block", Vgb Kraftwerkstechnik, Vgb Kraftwerkstechnik GMBH. Essen, DE, vol. 77, No. 5, May 1, 1997 (May 1, 1997), pp. 358-362, XP000690909, ISSN: 0372-5715.*

(Continued)

*Primary Examiner* — Laert Dounis

(57) ABSTRACT

A coal fired Oxy boiler power plant having a combustion system configured to burn coal using an oxygen stream to produce a flue gas stream, a CO2 capture system connected to the flue gas stream and a steam cycle with serially arranged low pressure heaters forming part of a condensate system. The combustion system includes, an Air Separation Unit for removing N2 from air to produce the oxygen stream for the boiler. The Air Separation Unit includes an Air Separation Unit heat exchanger that is thermally and fluidly connected to the condensate system so as to be fluidly parallel to at least one serial low pressure heater and fluidly parallel to at least one less that the total number of serial low pressure heaters. The Flue Gas Heat Recovery System, Flue Gas Condenser and Gas Processing unit are thermally integrated into the condensate system.

16 Claims, 7 Drawing Sheets

(51) Int. Cl.
  *F23J 15/06* (2006.01)
  *F23L 7/00* (2006.01)
  *F01K 9/02* (2006.01)
  *F22D 1/02* (2006.01)
  *F23J 15/02* (2006.01)
  *F22D 1/36* (2006.01)

(52) U.S. Cl.
  CPC .............. *F22D 1/02* (2013.01); *F22D 1/36* (2013.01); *F23J 15/02* (2013.01); *F23J 15/06* (2013.01); *F23J 2215/50* (2013.01); *F23J 2219/70* (2013.01); *F23L 2900/07005* (2013.01); *Y02C 10/04* (2013.01); *Y02E 20/12* (2013.01); *Y02E 20/326* (2013.01); *Y02E 20/344* (2013.01); *Y02E 20/363* (2013.01)

(58) Field of Classification Search
  CPC ............... Y02C 10/08; Y02C 10/14; F01K 17/00–17/06; F01K 7/34–7/44
  USPC .......... 60/677, 678, 685, 690–693; 423/220, 423/437.1; 110/345; 95/139, 183
  See application file for complete search history.

(56) References Cited

U.S. PATENT DOCUMENTS

| | | | |
|---|---|---|---|
| 3,032,999 | A | 5/1962 | Pacault |
| 3,271,960 | A | 9/1966 | Brunner |
| 3,374,621 | A | 3/1968 | Pacault et al. |
| 3,423,933 | A | 1/1969 | Knizia |
| 3,835,650 | A | 9/1974 | Chesmejef |
| 4,069,674 | A * | 1/1978 | Warren ............ F01K 7/40 60/641.8 |
| 4,516,403 | A | 5/1985 | Tanaka |
| 4,729,217 | A | 3/1988 | Kehlhofer |
| 4,897,999 | A | 2/1990 | Varney |
| 4,976,107 | A | 12/1990 | Korpela |
| 5,344,627 | A | 9/1994 | Fujii et al. |
| 5,345,756 | A | 9/1994 | Jahnke et al. |
| 5,836,162 | A | 11/1998 | Haynes |
| 7,581,395 | B2 | 9/2009 | Takeuchi et al. |
| 2002/0023423 | A1 | 2/2002 | Viteri et al. |
| 2005/0235650 | A1 | 10/2005 | Griffin et al. |
| 2006/0254251 | A1 | 11/2006 | Yamada |
| 2008/0302107 | A1 | 12/2008 | Fan et al. |
| 2009/0178408 | A1* | 7/2009 | Brugerolle .......... F25J 3/0406 60/645 |
| 2010/0071380 | A1 | 3/2010 | Buecker et al. |
| 2010/0132360 | A1 | 6/2010 | Gericke |
| 2010/0258005 | A1 | 10/2010 | Oishi et al. |
| 2011/0220744 | A1 | 9/2011 | Zhao et al. |
| 2011/0277479 | A1 | 11/2011 | Richter et al. |
| 2011/0290163 | A1 | 12/2011 | Kobayashi |
| 2012/0111007 | A1 | 5/2012 | Frueh et al. |
| 2012/0129112 | A1 | 5/2012 | Cegarra Cruz et al. |
| 2012/0151917 | A1 | 6/2012 | Ungerer et al. |
| 2012/0216540 | A1 | 8/2012 | Stoever et al. |
| 2012/0324893 | A1* | 12/2012 | Hayashi ............ F01K 7/40 60/691 |
| 2013/0062883 | A1 | 3/2013 | Kaneeda et al. |
| 2013/0099508 | A1 | 4/2013 | Handagama et al. |
| 2014/0007576 | A1 | 1/2014 | Alekseev |
| 2014/0065559 | A1 | 3/2014 | Jukkola |
| 2015/0369483 | A1* | 12/2015 | Pourchot ............ F23J 15/02 110/203 |
| 2016/0033128 | A1 | 2/2016 | Stuxberg |

FOREIGN PATENT DOCUMENTS

| | | |
|---|---|---|
| DE | 10 2009 014 185 A1 | 9/2010 |
| EP | 2682569 A1 | 1/2014 |
| EP | 2 706 294 A1 | 3/2014 |
| JP | 06002806 A * | 1/1994 |
| WO | WO 2009/010931 A2 | 1/2009 |
| WO | 2011006862 A2 | 1/2011 |

OTHER PUBLICATIONS

European Search Report dated Jan. 28, 2015.
Bouillon et al., "ECO2 : Post-Combustion of Oxyfuel—A Comparison Between Coal Plants with Integrated Co2 Capture" Energy Procedia, vol. No. 01, pp. 4015-4022, 2009.
Pourchot et al., "Integration of Oxy Combustion in a Large Size USC PC Plant for a Competitive Solution", 3rd Oxyfuel Combustion Conference, Spain, pp. 1-20, Sep. 12, 2013.
European Search Report and Opinion issued in connection with Related EP Application No. 14290140.4 dated Jan. 28, 2015.
European Search Report and Opinion issued in connection with Related EP Application No. 14290141.2 dated Jan. 28, 2015.
U.S. Non-Final Office Action issued in connection with Related U.S. Appl. No. 14/707,593 dated Dec. 21, 2016.
U.S. Non-Final Office Action issued in connection with Related U.S. Appl. No. 14/675,305 dated Feb. 17, 2017.
U.S. Non-Final Office Action issued in connection with Related U.S. Appl. No. 14/682,879 dated Feb. 23, 2017.
U.S. Final Office Action issued in connection with Related U.S. Appl. No. 14/707,593 dated May 10, 2017.
U.S. Final Office Action issued in connection with Related U.S. Appl. No. 14/675,305 dated Jul. 6, 2017.
U.S. Final Office Action issued in connection with Related U.S. Appl. No. 14/682,879 dated Jul. 6, 2017.

* cited by examiner

COAL FIRED OXY PLANT WITH AIR SEPARATION UNIT INCLUDING PARALLEL COUPLED HEAT EXCHANGER

TECHNICAL FIELD

The present disclosure relates to thermal arrangements of coal fired oxy plants with integrated CO2 capture and a steam/water power cycle.

BACKGROUND INFORMATION

Coal contributes a large percentage of the electricity generation in the world today and is expected to maintain its dominant share in the foreseeable future. Nonetheless, significant environmental pressures have led to the development of emission reduction systems to meet every increasing environmental demands. As a result, plant designs have had to meeting the contradictory requirements of high efficiency operation at reduced CO2, SO2, NOx, emission levels.

A particular advantageous plant arrangement arising out of these developments is the Oxy-combustion steam plant with CO2 capture. Rather than operating an air combustion system, the system uses oxygen, usually produced in an air separation unit for the combustion of the primary fuel. Oxy-combustion processes produce flue gas typically having CO2, water and O2 as its main constituents wherein the CO2 concentration is typically greater than about 70% by volume. The high concentration of CO2 enables relatively simply CO2 Capture in a Gas Processing Unit.

A typical arrangement of an oxy-combustion capture plant includes several pre CO2 extraction purification steps. These may include an Electrostatic Precipitator for removing particulate matter, a Flue Gas Desulfuriser for removing sulphur, and a Flue gas condenser for water removal. For reasons of thermal efficiency, a Flue Gas Heat Recovery System may additionally be located between the Electrostatic Precipitator and Flue Gas Desulfuriser.

An example of a typical water steam cycle of a high efficiency oxy-combustion steam plants is shown in FIG. 1. The plant comprises a triple-pressure series of reheat steam turbines HP, IP. LP fed by steam from a boiler 42. Exhaust steam from the last low pressure steam turbine LP is condensed in a condenser 2 before being polished 4 and pumped 3 successively through a series of low pressure heater 6, 7, 8, 9, 31, a feed water tank 36 and high pressure heaters 32 before returning to the boiler 42 in a closed loop. The heat source for the low and high pressure heaters is typically steam extracted from the low/intermediate and high pressure steam turbines.

Due to the large benefit in ensuring the highest efficiency cycle there is a continuing need to find ways of better integrating the thermal sinks of the oxy-combustion capture systems within the steam power plant. This requires an optimization of the heat sinks of the capture systems with the plant cycle to ensure no energy is wasted. In particular, this needs consideration of how to integrate the Air Separation Unit, Flue Gas Heat Recovery System, Flue Gas Condenser and Gas Processing Unit into the steam cycle.

SUMMARY

A coal fired Oxy boiler with oxygen supply system and flue gas CO2 capture system and a steam cycle power plant scheme is provided that integrates major heat generation sources of the systems in order to provide flexible plant operation and improved overall plant thermal efficiency.

An aspect provides a coal fired Oxy boiler power plant having a combustion system, a CO2 capture system and a steam power plant. The combustion system comprises an Air Separation Unit, for removing N2 from air to produce an oxygen stream, having an Air Separation Unit heat exchanger as part of the a compressed air stream used for oxygen stream production, while the steam boiler is adapted to burn coal using the oxygen stream to produce a CO2 rich flue gas stream.

The CO2 capture system is configured and arranged to remove CO2 from the flue gas stream.

The steam power plant has a condensate system comprising a condenser for condensing steam, a plurality of low pressure heaters arranged in series and configured and arranged to receive the condensate from the condenser. A feed water tank is configured and arranged to receive condensate from the serial low pressure heaters.

In this arrangement, the Air Separation Unit heat exchanger is thermally and fluidly connected to the condensate system so as to be fluidly parallel to at least one serial low pressure heater and fluidly parallel to at least one less that the total number of serial low pressure heaters. This arrangement provides the basis for thermal integration of heat sources from to the CO2 capture system, including an Air Separation Unit, a Flue Gas Heat Recovery, a Flue Gas Condenser and/or a Gas Processing Unit so as to operate the plant at part load down to 40% on oxy mode, in air mode up to 75% load, and in back-up mode with interruption of one of several of heat recovery systems.

It is a further object of the invention to overcome or at least ameliorate the disadvantages and shortcomings of the prior art or provide a useful alternative.

Other aspects and advantages of the present disclosure will become apparent from the following description, taken in connection with the accompanying drawings which by way of example illustrate exemplary embodiments of the present invention.

BRIEF DESCRIPTION OF THE DRAWINGS

By way of example, an embodiment of the present disclosure is described more fully hereinafter with reference to the accompanying drawings, in which.

DETAILED DESCRIPTION

Figure 1:
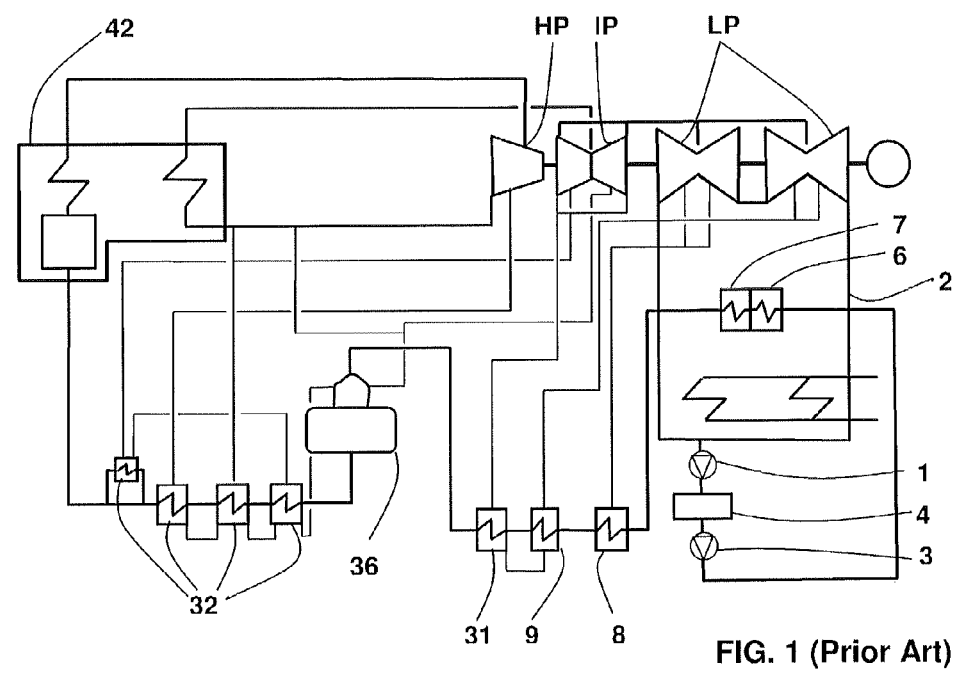
FIG. 1 is a flow diagram of a patent of the prior art.

Exemplary embodiments of the present disclosure are now described with references to the drawings, wherein like reference numerals are used to refer to like elements throughout. In the following description, for purposes of explanation, numerous specific details are set forth to provide a thorough understanding of the disclosure. However, the present disclosure may be practiced without these specific details, and is not limited to the exemplary embodiments disclosed herein.

Exemplary embodiments shown in FIGS. 2 to 13 are applied to an oxy-combustion plant having an oxy fired boiler 42 with an integrated CO2 capture system for polishing flue gas emitted from the boiler and separating CO2 therefrom in a Gas Processing Unit and steam/water Rankine cycle configured to generate electrical power. The steam/water cycle includes a condenser extraction pump arrangement having a first stage 1 connected to a condenser 2 outlet and a second stage 3 located at the outlet of a Condensate Polishing Plant 4. This arrangement is located upstream of a condensate heating train consisting of serially arranged low pressure heaters 6, 7, 8, 9, 31. Heated condensate from low pressure heaters 6, 7, 8, 9, 31 is feed into a Feed water tank 36.

The oxy-combustion plant further includes an Air Separation Unit for removing nitrogen from air to produce an oxygen rich stream to be fed to the boiler 42. Thermal energy from the Air Separation Unit is advantageously removed in an Air Separation Unit heat exchanger 11 by heating condensate extracted from the condensate system so as to bypass at less one of the low pressure heaters 6, 7, 8, 9, 31 such that the Air Separation Unit heat exchanger 11 is fluidly parallel to at least one less that the total number of low pressure heaters.

Figure 2:
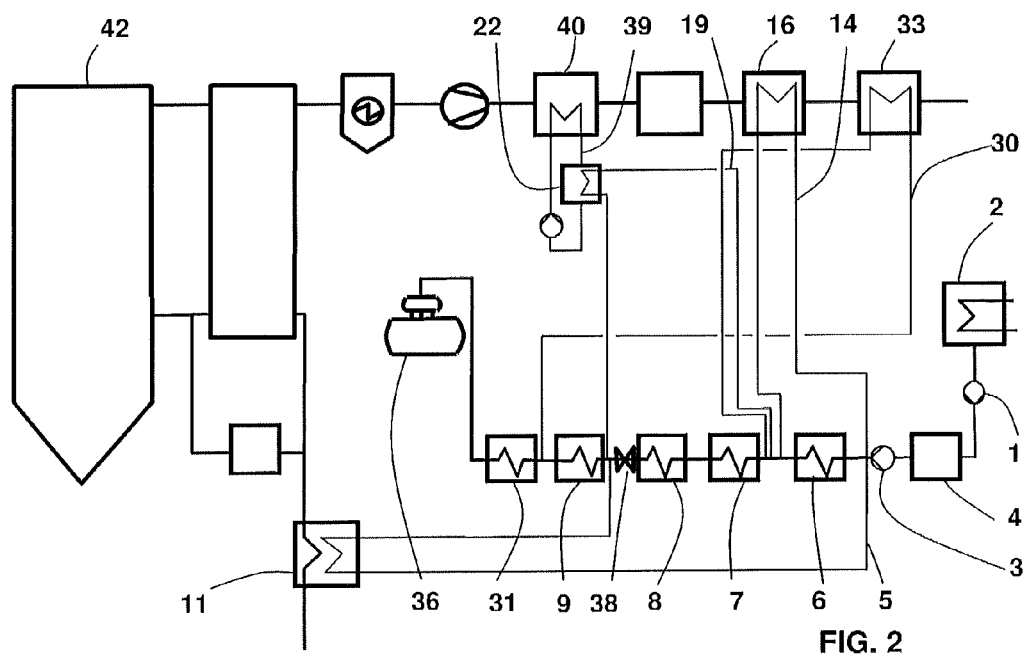
FIGS. 2 to 13 are flow diagrams of exemplary embodiments showing the integration of different CO2 capture system heat integration schemes in a coal fired Oxy Boiler plant that are adapted to complement the thermal integration of an Air Separation Unit into condensate system of the Oxy Boiler plant.

In a further exemplary embodiment shown in FIG. 2, the oxy combustion plant comprises at least five serial low pressure heaters 6, 7, 8, 9, 31 arranged in a condensate flow series and the Air Separation Unit is fluidly connected to the condensate system at a point upstream of the first of the serial low pressure heaters 6 as well as at a point between the third of the serial low pressure heaters 8 and the fourth of the serial low pressure heaters 9. In this way, condensate passing through the Air Separation Unit heat exchanger 11 bypasses three of the serial low pressure heaters 6, 7, 8.

Figure 3:
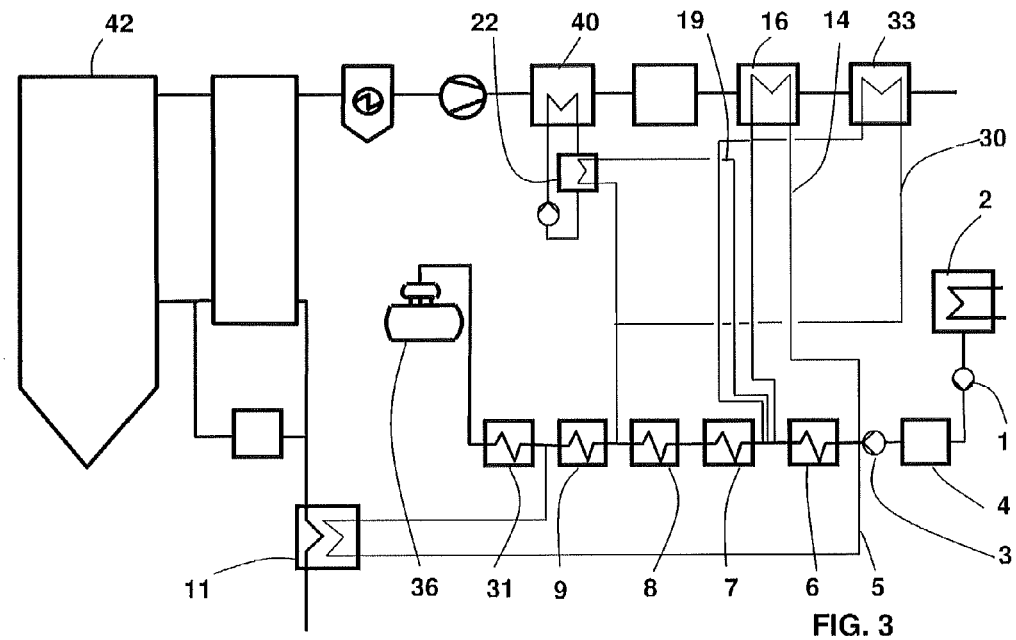

In a further alternate exemplary embodiment shown in FIG. 3, the oxy combustion plant comprises at least five serial low pressure heaters 6, 7, 8, 9, 31 arranged in a condensate flow series and the Air Separation Unit is fluidly connected to the condensate system at a point upstream of the first of the serial low pressure heaters 6 as well as at a point between the fourth of the serial low pressure heaters 9 and the fifth of the serial low pressure heaters 31. In this way, condensate passing through the Air Separation Unit heat exchanger 11 bypasses four of the serial low pressure heaters 6, 7, 8, 9.

Figure 4:
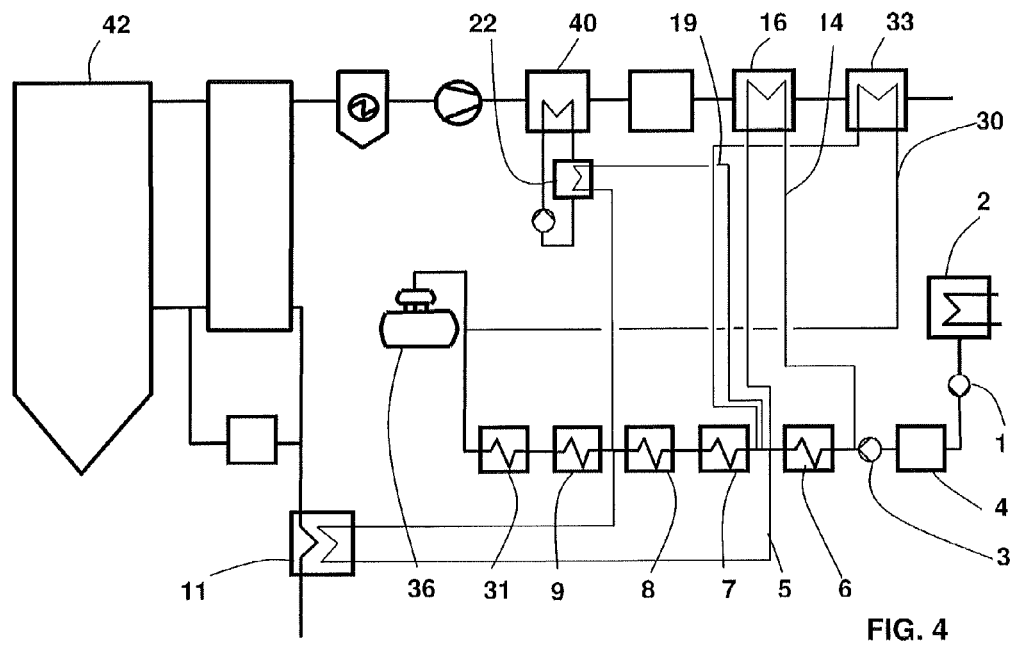

In a further alternate exemplary embodiment shown in FIG. 4, the oxy combustion plant comprises at least five serial low pressure heaters 6, 7, 8, 9, 31 arranged in a condensate flow series and the Air Separation Unit is fluidly connected to the condensate system at a point between the first of the serial low pressure heaters 6 and the second of the serial low pressure heaters 7 as well as at a point between the third of the serial low pressure heaters 8 and the fourth of the serial low pressure heaters 9. In this way, condensate passing through the Air Separation Unit heat exchanger 11 bypasses two of the serial low pressure heaters 6, 7.

Figure 5:
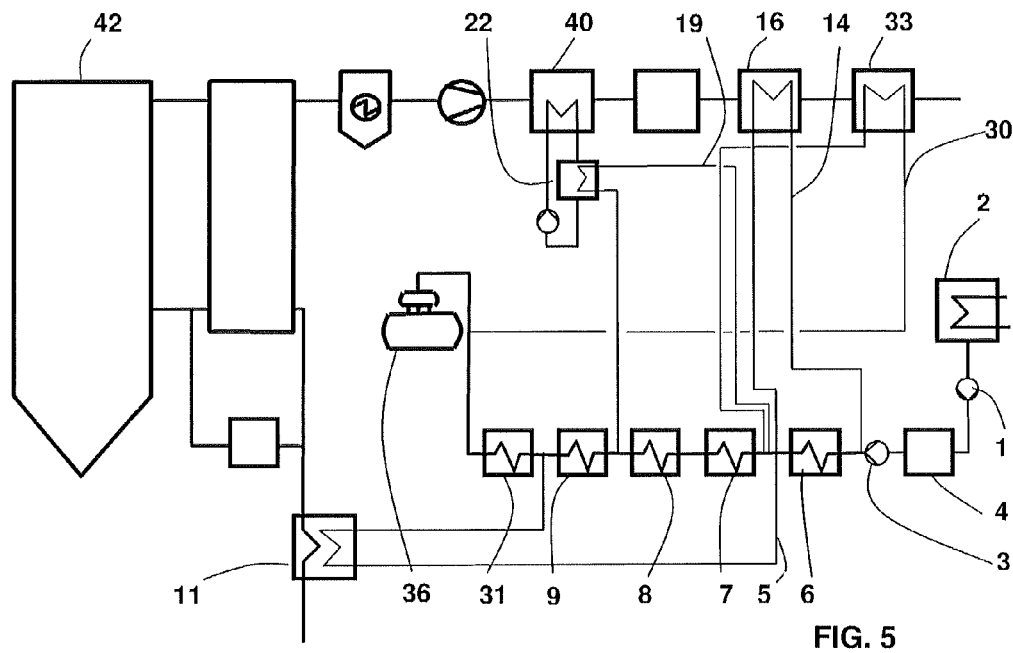

In a further alternate exemplary embodiment shown in FIG. 5, the oxy combustion plant comprises at least five low pressure heaters arranged in a condensate flow series and the Air Separation Unit is fluidly connected to the condensate system at a point between the first of the serial low pressure heaters and the second of the serial low pressure heaters as well as at a point between the fourth of the serial low pressure heaters 9 and the fifth of the serial low pressure heaters 31. In this way condensate passing through the Air Separation Unit heat exchanger bypasses three of the serial low pressure heaters 7, 8, 9, preferably the second, third and fourth of the serial low pressure heaters 7, 8, 9.

Figure 11:
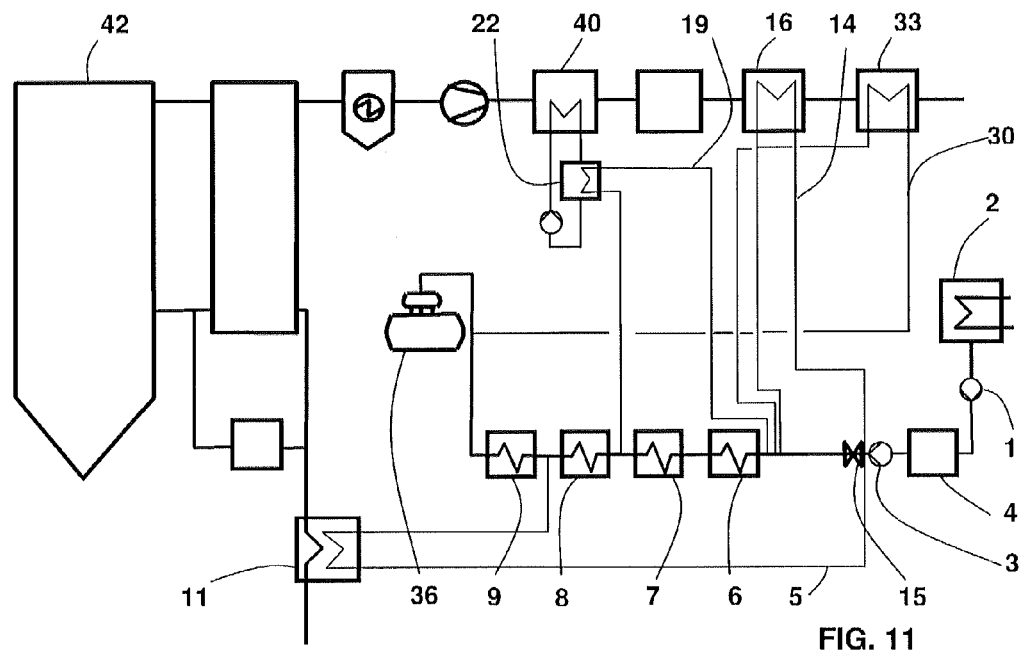
Figure 12:
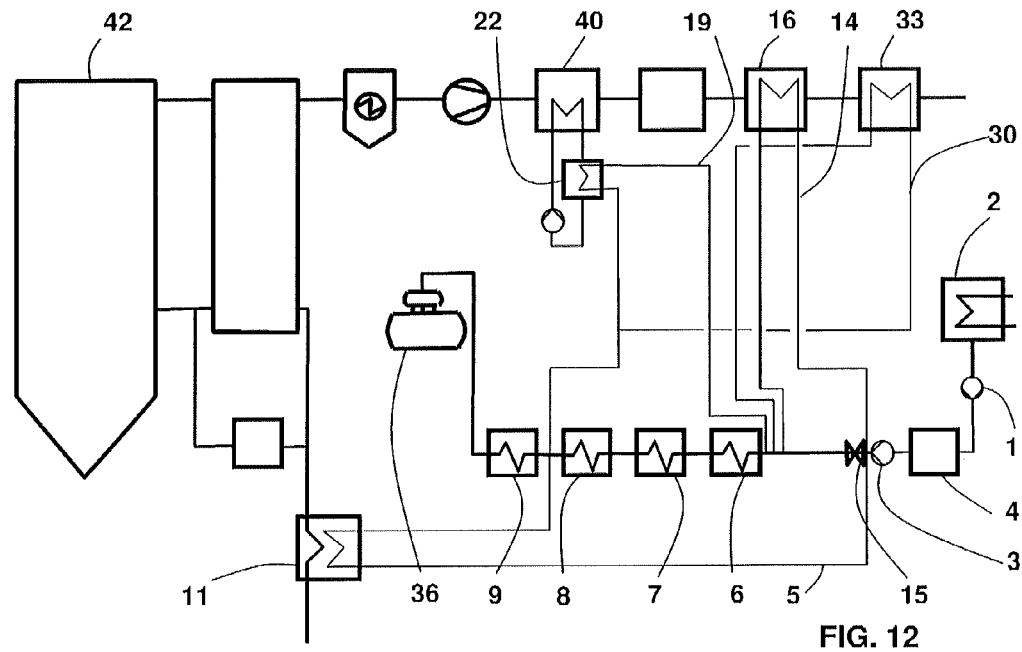
Figure 13:
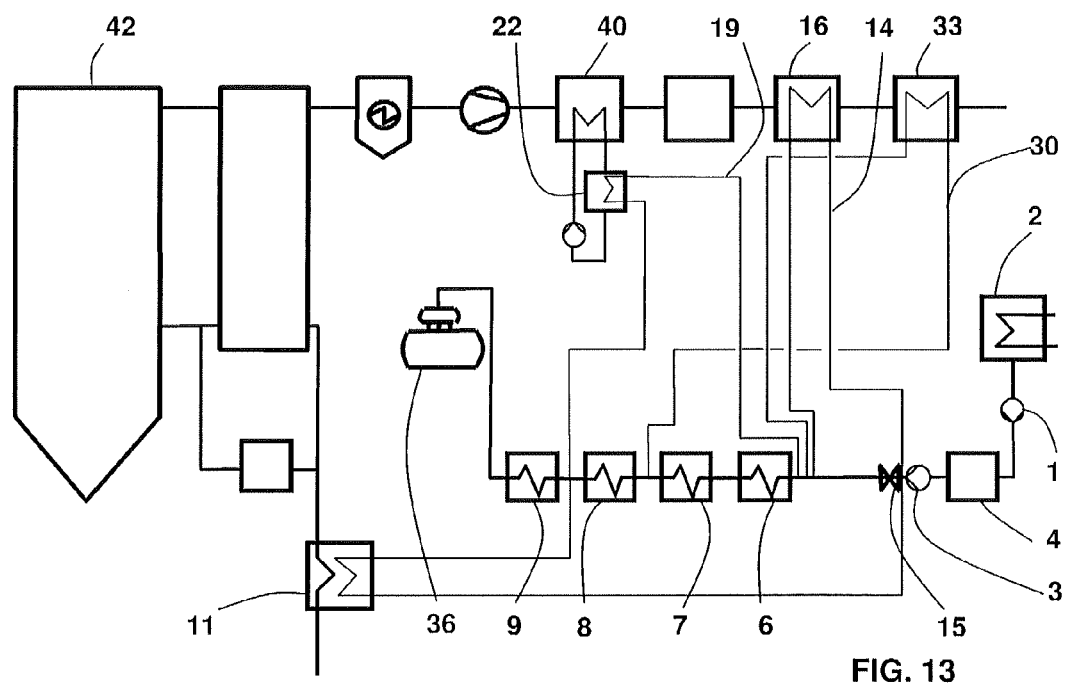

In alternative exemplary embodiments shown in FIGS. 11 to 13, the oxy combustion plant comprises only 4 serial low pressure heaters 6, 7, 8, 9 instead of at least 5. The choice between having either 4 or at least 5 serial low pressure heaters 6, 7, 8, 9, 31 depends on the application of the Flue Gas Condenser and the decision to privilege the capture operation or not, Each of the alternate exemplary embodiments makes it possible to match temperatures of the Air Separation Unit to the condensate system thus ensuring optimum heat recovery defined by a combination of outlet temperature and recovery duty criteria thus leading to maximum net energy transfer.

Figure 6:
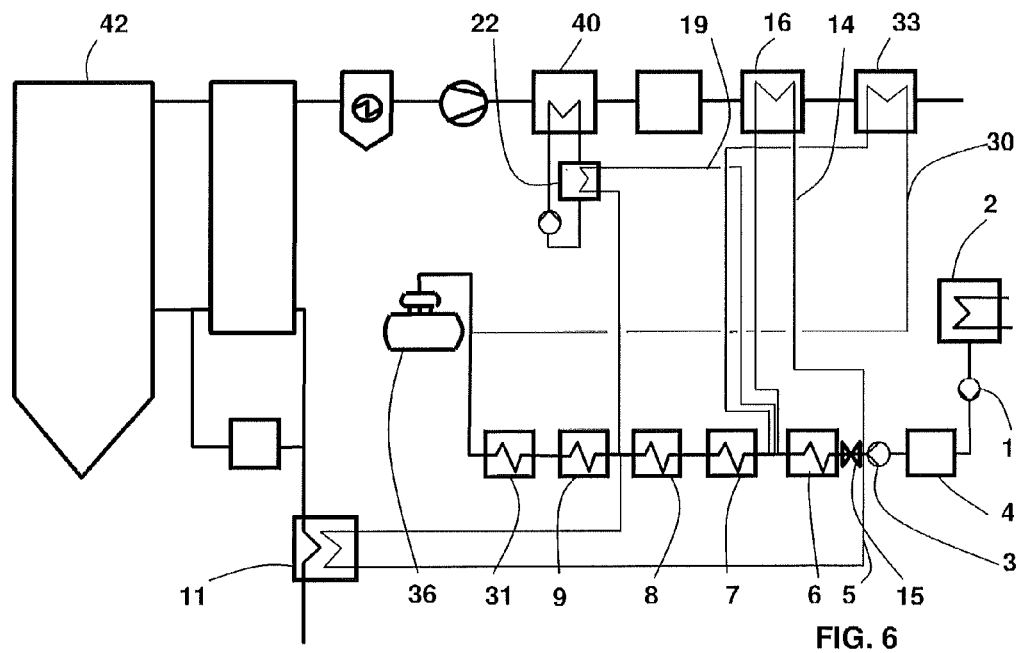

In an exemplary embodiment shown in FIG. 6, the coal fired Oxy boiler power plant comprises a plurality of low pressure heaters 6, 7, 8, 9, 31 arranged in a condensate flow series while the CO2 capture system comprises a Flue Gas Condenser 16, for removing condensables from the flue gas stream. The Flue Gas Condenser 16 further includes a Flue Gas Condenser condensate line 14 connected to the condensate system at a first end upstream of the first of the serial low pressure heaters 6 and at a second end between the first of the serial low pressure heaters 6 and second of the serial low pressure heaters 7. In this arrangement, the condensate system further includes a bypass valve 15 between the first of the serial low pressure heaters 6 and the first end of the Flue Gas Condenser condensate line 14 so that, when the bypass valve 15 is closed, condensate fully bypasses the first of the serial low pressure heater 6.

It was found that this particular arrangement enables efficient operation if the oxy-combustion plant is operated in air mode, for example, during start-up, or if the Flue Gas Condenser 16 needs to be taken offline for maintenance. Although this embodiment is shown with an Air Separation Unit heat exchanger 11 arrangement equivalent to that shown in FIG. 2, the embodiment may be applied to other Air Separation Unit heat exchanger 11 arrangements, including those shown in FIG. 3, 4 or 5.

In further exemplary embodiments shown in FIGS. 11 to 13, the condensate system does not include any serial low pressure heaters between the first end and the second end of the Flue Gas Condenser condensate line 14. In this arrangement, the first of the serial low pressure heaters 6 is located downstream of the second end of the Flue Gas Condenser condensate line 14 and the total number of the serial low pressure heaters is typically four. The flow rate of condensate through the Flue Gas Condenser condensate line 14 is controllable by the bypass valve 15 located in the condensate system between the first and second ends of the Flue Gas Condenser condensate line 14.

In an exemplary embodiment shown in FIG. 2 the coal fired oxy boiler plant, in addition to a condensate system having at least four serial low pressure heaters 6, 7, 8, 9, 31, includes a CO2 capture system with a Flue Gas Heat Recovery System 40 for recovering heat from the flue gas. The Flue Gas Heat Recovery System further includes a primary heat recovery loop 39 adapted to flow, in a closed loop, a heat transfer medium through the Flue Gas Heat Recovery System so that the transfer medium exchanges thermal energy with flue gas. Included in the primary heat recover loop 39 is a Flue Gas Heat Recovery System heat exchanger 22 with a Flue Gas Heat Recovery System heat exchanger condensate line 19 fluidly connected at a first end to the condensate system at a point between the first of the serial low pressure heaters 6 and the second of the serial low pressure heaters 7, and at a second end further connected to the condensate system at a point between the third of the serial low pressure heaters 8 and the fourth of the serial low pressure heaters 9.

In a further exemplary embodiment shown in FIG. 2, a control valve 38 is located in the condensate system fluidly between the third of the serial low pressure heaters 8 and the fourth of the serial low pressure heaters 9 at a point upstream of the second end of the Flue Gas Heat Recovery System heat exchanger condensate line 19 and the second end of the Air Separation Unit heat exchanger condensate line 5. This makes it possible to control the ratio of condensate flow between through the Flue Gas Heat Recovery System heat exchanger 22, the Air Separation Unit heat exchanger 11, and upstream serial low pressure heaters 6, 7, 8.

Figure 7:
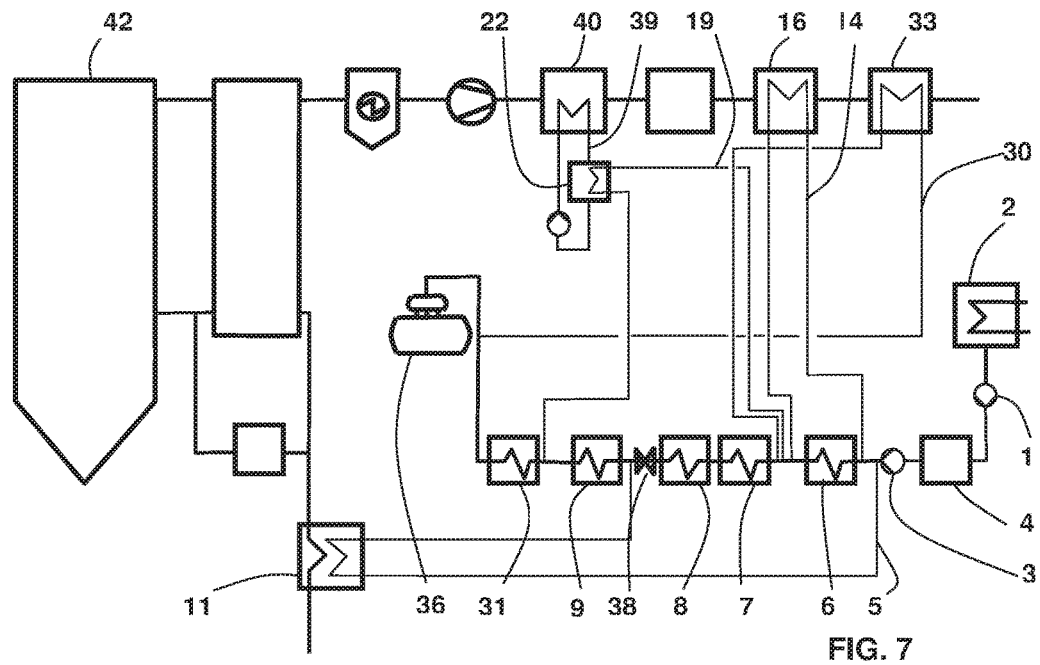

In an exemplary embodiment shown in FIG. 7 the coal fired oxy boiler plant, in addition to a condensate system having at least four serial low pressure heaters 6, 7, 8, 9, 31 includes a CO2 capture system with a Flue Gas Heat Recovery System 40 for recovering heat from the flue gas. The Flue Gas Heat Recovery System further includes a primary heat recovery loop 39 adapted to flow, in a closed loop, a heat transfer medium through the Flue Gas Heat Recovery System so that the transfer medium exchanges thermal energy with flue gas. Included in the primary heat recover loop 39 is a Flue Gas Heat Recovery System heat exchanger 22 with a Flue Gas Heat Recovery System heat exchanger condensate line 19 that is fluidly connected at a first end to the condensate system at a point between the first of the serial low pressure heaters 6 and the second of the serial low pressure heaters 7 and, at a second end, further connected to the condensate system at a point between the fourth of the serial low pressure heaters 9 and the fifth of the serial low pressure heaters 31.

In a further exemplary embodiment shown in FIG. 7, a control valve 38 is located in the condensate system fluidly between the third of the serial low pressure heaters 8 and the fourth of the serial low pressure heaters 9 at a point upstream of the second end of the Air Separation Unit heat exchanger condensate line 5. This makes it possible to control the ratio of condensate flow between through the Flue Gas Heat Recovery System heat exchanger 22, the Air Separation Unit heat exchanger 11, and upstream serial low pressure heaters 6, 7, 8.

Figure 8:
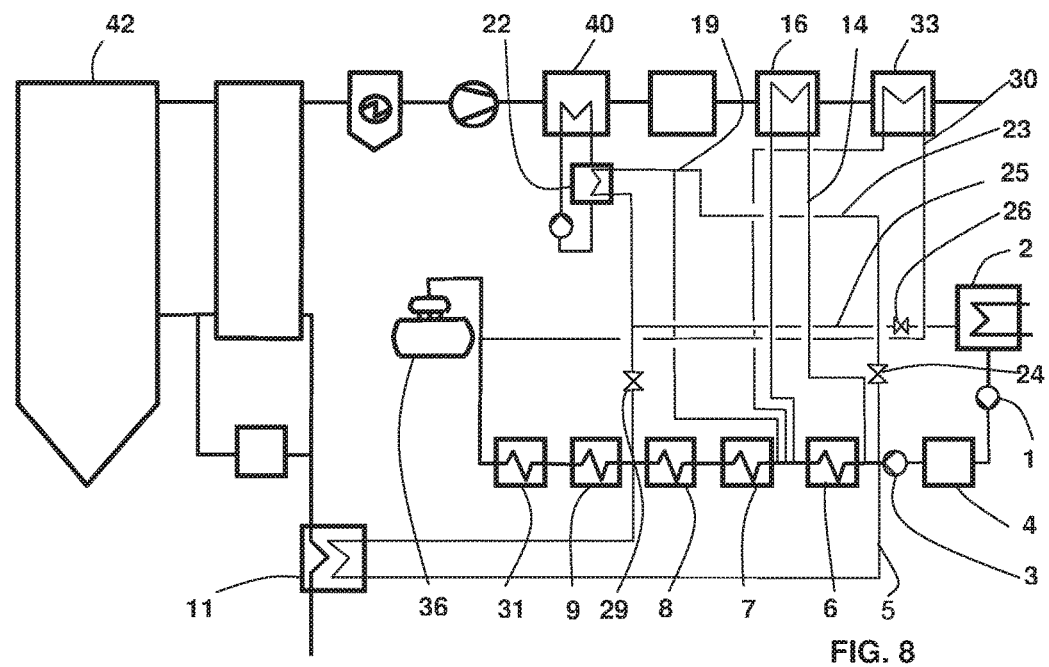

In an exemplary embodiment shown in FIG. 8, for emergency/protection reasons, the plant includes a first fluid line 23 and a second fluid line 25. The first fluid line 23 has a first end connected to the condensate system between the first of the serial low pressure heaters 6 and a condensate extraction pump second stage 3 located downstream of the condenser 2 and a second end connected to the Flue Gas Heat Recovery System condensate line 19 upstream of the Flue Gas Heat Recovery System heat exchanger 22. In an exemplary embodiment in which the plant includes a Flue Gas Condenser the first fluid line 23 has a first end connected to the condensate system between the first end of the Flue Gas Condenser condensate line 14 and a condensate extraction pump second stage 3 located downstream of the condenser 2 and a second end connected to the Flue Gas Heat Recovery System condensate line 19 upstream of the Flue Gas Heat Recovery System heat exchanger 22. The first fluid line 23 includes a valve 24 that is closed during normal operation and open in emergency operation for thermal protection of the Flue Gas Heat Recovery System. When emergency protection is activated, to prevent backflow of condensate through the Flue Gas Heat Recovery System condensate line 19 into the Flue Gas Condenser condensate line 14, the Flue Gas Heat Recovery System condensate line 19 includes a reverse flow prevention means, such as a mechanical or actuated non-return valve, in the Flue Gas Heat Recovery System condensate line 19, fluidly upstream of the first fluid line 23 second end. The second fluid line 25 connects the Flue Gas Heat Recovery System heat exchanger with the condenser 2 and includes a valve 26 that is closed during normal operation and open in emergency operation for thermal protection of the Flue Gas Heat Recovery System. When emergency protection is activated, to ensure that condensate flows to the condenser 2, a valve 29 is located in the Flue Gas Heat Recovery System condensate line 19 fluidly between the second end of the Flue Gas Heat Recovery System condensate line 19 and the second fluid line 25. When closed for emergency protection this enables the flow of condensate from the Flue Gas Heat Recovery System condensate line 19 to the condenser 2.

Figure 9:
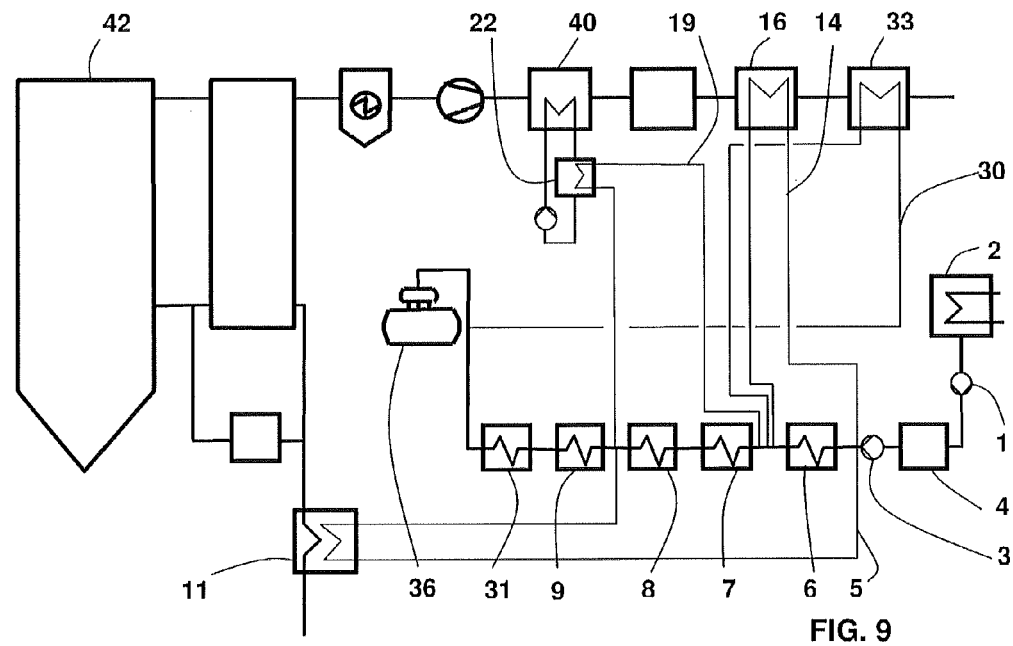

In further exemplary embodiment shown in FIG. 9, the coal fired Oxy boiler power plant comprises five low pressure heaters 6, 7, 8, 9, 31 arranged in a condensate flow series. The CO2 capture system comprises a Flue Gas Condenser 16 downstream of the Flue Gas Heat Recovery System 40 and a Gas Processing Unit heat exchanger 33 for cooling of compressed rich-CO2 flue-gas before separation of CO2. The Flue Gas Condenser 16 includes a Flue Gas Condenser condensate line 14 connected to the condensate system at a first end upstream of the first of the serial low pressure heaters 6 and at a second end connected to a point between the first of the serial low pressure heaters 6 and the second of the serial low pressure heaters 7. The Gas Processing Unit heat exchanger 33 has a Gas Processing Unit condensate line 30 connected at a first end to the condensate system at a point between the first of the serial low pressure heaters 6 and the second of the serial low pressure heaters 7 and connected at a second end to the condensate system at a point fluidly between the fifth of the serial low pressure heaters 31 and the Feed Water Tank 36.

Figure 10:
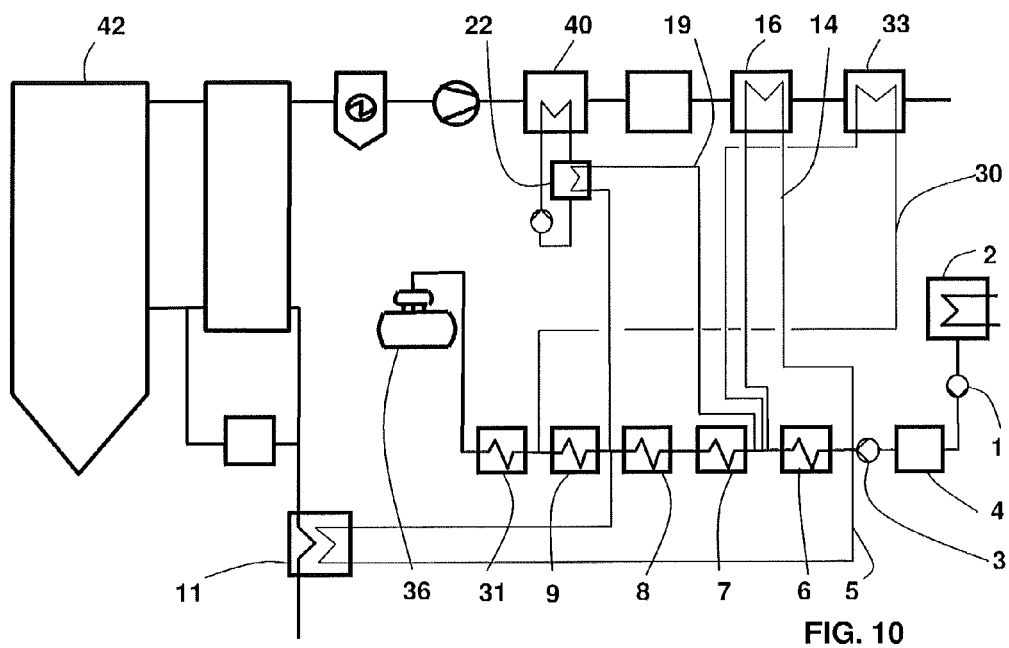

In further exemplary embodiment shown in FIG. 10, the coal fired Oxy boiler power plant comprises at least four low pressure heaters 6, 7, 8, 9, 31 arranged in a condensate flow series. The CO2 capture system comprises a Flue Gas Condenser 16 downstream of the Flue Gas Heat Recovery System 40 and a Gas Processing Unit heat exchanger 33 for cooling of compressed rich-CO2 flue-gas before separation of CO2. The Flue Gas Condenser 16 includes a Flue Gas Condenser condensate line 14 connected to the condensate system, at a first end, upstream of the first of the serial low pressure heaters 6 and, at a second end, to a point between the first of the serial low pressure heaters 6 and the second of the serial low pressure heaters 7. The Gas Processing Unit heat exchanger 33 has a Gas Processing Unit condensate line 30 connected, at first end, to the condensate system at a point between the first of the serial low pressure heaters 6 and the second of the serial low pressure heaters 7 and connected, at a second end, to the condensate system at a point between the fourth of the serial low pressure heaters 9 and the fifth of the serial low pressure heaters 31.

In an exemplary embodiment shown in FIGS. 11 to 13, the coal fired oxy boiler power plant has four low pressure heaters 6, 7, 8, 9 while the CO2 capture system further comprises a Flue Gas Condenser 16 having a Flue Gas Condenser condensate line 14 connected at first and second ends upstream of the of the first of the serial low pressure heaters 6. A bypass valve 15, for controlling the quantity of condensate flowing through the Flue Gas Condenser, is located between the ends of the Flue Gas Condenser condensate line 14. The Gas Processing Unit condensate line 30 may be connected to the condensate system at different points. For example, in an exemplary embodiment shown in FIG. 2 first and second end of the Gas Processing Unit condensate line 30 are connected to a point between a first of the serial low pressure heaters 6 and a second of the serial low pressure heaters 7 and a point between a fourth of the serial low pressure heaters 9 and a fifth of the serial low pressure heaters 31 respectively.

In another exemplary embodiment shown in FIG. 3, first and second ends of the Gas Processing Unit condensate line 30 are connected to a point between a first of the serial low pressure heaters 6 and a second of the serial low pressure heaters 7 and a point between a third of the serial low pressure heaters 8 and a fourth of the serial low pressure heaters 9.

In another exemplary embodiment shown in FIG. 11, first and second ends of the Gas Processing Unit condensate line 30 are connected to a point upstream of a first of the serial low pressure heaters 6 and at a point between a fourth of the serial low pressure heaters 9 and the Feed Water Tank 36.

In another exemplary embodiment shown in FIG. 12 first and second ends of the Gas Processing Unit condensate line 30 are connected to a point upstream of a first of the serial low pressure heaters 6 and at a point between a third of the serial low pressure heaters 8 and a fourth of the serial low pressure heaters 9.

In another exemplary embodiment shown in FIG. 13, first and second ends of the Gas Processing Unit condensate line 30 are connected to a point upstream of a first of the serial low pressure heaters 6 and at a point between a second of the serial low pressure heaters 7 and a third of the serial low pressure heaters 8. In order to globally control the flow of condensate through the CO2 capture system heat exchangers and the Air Separation Unit heat exchanger, a control valve 38 is located in the condensate system fluidly between the serial low pressure heaters 6, 7, 8, 9, 31 immediately upstream of the second ends of the condensate lines 5, 19, 30 of the Air Separation Unit heat exchanger 11, the Flue Gas Heater Recovery System heat exchanger 22 and the Gas Processing Unit heat exchanger 33.

Although the disclosure has been herein shown and described in what is conceived to be the most practical exemplary embodiment, it will be appreciated by those skilled in the art that the present disclosure can be embodied in other specific forms without departing from the spirit or essential characteristics thereof. For example, although heat exchangers are referenced in the singular each system may include multiple heat exchangers fluidly connected to the condensate system arranged either parallel or in series. The presently disclosed embodiments are therefore considered in all respects to be illustrative and not restricted. The scope of the disclosure is indicated by the appended claims rather that the foregoing description and all changes that come within the meaning and range and equivalences thereof are intended to be embraced therein.

REFERENCE NUMBERS

1 Condenser Extraction pump first stage
2 Condenser
3 Condenser Extraction pump second stage
4 Condensate polishing plant
5 Air Separation Unit heat exchanger condensate line
6 Low Pressure heater #1
7 Low Pressure heater #2
8 Low Pressure heater #3
9 Low Pressure heater #4
11 Air Separation Unit heat exchanger
14 Flue Gas Condenser condensate line
15 Bypass valve
16 Flue Gas Condenser
19 Flue Gas Heat Recovery System heat exchanger condensate line
22 Flue Gas Heat Recovery System heat exchanger
23 Fluid line
24 Valve
25 Fluid line
26 Valve
29 Valve
30 Gas Processing Unit heat exchanger condensate line
31 Low Pressure heater#5
32 High pressure heaters
33 Gas Processing Unit heat exchanger
36 Feed water tank
38 Control valve
40 Flue Gas Heat Recovery System
42 Boiler
HP High Pressure steam turbine
IP Intermediate pressure steam turbine
LP Low pressure steam turbine

What is claimed is:

1. A coal fired Oxy boiler power plant having:
a combustion system comprising:
an Air Separation Unit, for removing N2 from air to produce an oxygen stream, having an Air Separation Unit heat exchanger to remove thermal energy from the Air Separation Unit;
a steam boiler configured to burn coal by using the oxygen stream to produce a flue gas stream;
a CO2 capture system configured and arranged to remove CO2 from the flue gas stream;
a steam power plant with a condensate system comprising:
a condenser for condensing steam;
a plurality of serial low pressure heaters, arranged in series and sequentially in a direction of a condensate flow, configured and arranged to receive the condensate from the condenser;
a feed water tank configured and arranged to receive condensate from the serial low pressure heaters;
the CO2 capture system comprising:
a Flue Gas Heat Recovery System heat exchanger, having a Flue Gas Heat Recovery System heat exchanger condensate line having:
a first end fluidly connected between a first of the serial low pressure heaters and a second of the serial low pressure heaters, and also fluidly connected between the first of the serial low pressure heaters and the condenser; and
a second end fluidly connected between a third of the serial low pressure heaters and a fourth of the serial low pressure heaters, and also fluidly connected to the condenser through a valve enabled to enable flow of condensate to the condenser when closed;
wherein the Air Separation Unit heat exchanger is thermally and fluidly connected to the condensate system by an Air Separation Unit heat exchanger condensate line so as to be fluidly parallel to at least one of the serial low pressure heaters and fluidly parallel to at least one less than a total number of the serial low pressure heaters, and so as to heat the condensate using the thermal energy from the Air Separation Unit.

2. The coal fired Oxy boiler power plant of claim 1 wherein the Air Separation Unit heat exchanger is fluidly connected to the condensate system at a location which is:
upstream of a first of the serial low pressure heaters; and
between a third of the serial low pressure heaters and a fourth of the serial low pressure heaters.

3. The coal fired Oxy boiler power plant of claim 1 wherein the Air Separation Unit heat exchanger condensate line is fluidly connected to the condensate system at a location which is:
　upstream of a first of the serial low pressure heaters; and
　between a fourth of the low pressure heaters and the feed water tank.

4. The coal fired Oxy boiler power plant of claim 1 wherein the Air Separation Unit heat exchanger condensate line is fluidly connected to the condensate system at a location which is:
　upstream of a first of the serial low pressure heaters; and
　between a second of the serial low pressure heaters and a third of the serial low pressure heaters.

5. The coal fired Oxy boiler power plant of claim 1 wherein the Air Separation Unit heat exchanger condensate line is fluidly connected to the condensate system at a location which is:
　between a first of the serial low pressure heaters and a second of the serial low pressure heaters; and
　between a third of the serial low pressure heaters and a fourth of the serial low pressure heaters.

6. The coal fired Oxy boiler power plant of claim 1 wherein the Air Separation Unit heat exchanger condensate line is fluidly connected to the condensate system at a location which is:
　between a first of the serial low pressure heaters and a second of the serial low pressure heaters; and
　between a fourth of the serial low pressure heaters and the feed water tank.

7. The coal fired Oxy boiler power plant of claim 1 comprising:
　a condensate flow control valve, in the condensate system, located fluidly at a location which is:
　between the first end and the second end of the Air Separation Unit heat exchanger condensate line; and
　between the first end and the second end of the Flue Gas Heat Recovery System heat exchanger condensate line.

8. The coal fired oxy boiler power plant of claim 1 wherein the Flue Gas Heat Recovery System condensate line includes a reverse flow prevention means fluidly upstream of the second end.

9. The coal fired oxy boiler power plant of claim 1 wherein the CO2 capture system comprises:
　a Flue Gas Condenser, for removing condensables from the flue gas stream, having a Flue Gas Condenser condensate line connected to the condensate system at a location which is at:
　a first end at a point upstream of a first of the serial low pressure heaters; and
　at a second end at a point between the first of the serial low pressure heaters and the first end of the Flue Gas Condenser condensate line, a bypass valve being located between the first end of the Flue Gas Condenser condensate line and the second end of the Flue Gas Condenser condensate line.

10. The coal fired Oxy boiler power plant of claim 1 wherein the CO2 capture system comprises:
　a Gas Processing Unit heat exchanger having a Gas Processing Unit condensate line connected to the condensate system at a location which is:
　between a first of the serial low pressure heaters and a second of the serial low pressure heaters; and
　between a fifth of the serial low pressure heaters and the Feed Water Tank.

11. The coal fired Oxy boiler power plant of claim 1 wherein the CO2 capture system comprises:
　a Gas Processing Unit heat exchanger having a Gas Processing Unit condensate line connected to the condensate system at a location which is:
　between a first of the serial low pressure heaters and a second of the serial low pressure heaters; and
　between a fourth of the serial low pressure heaters and a fifth of the serial low pressure heaters.

12. The coal fired Oxy boiler power plant of claim 1 wherein the CO2 capture system further comprises:
　a Gas Processing Unit heat exchanger having a Gas Processing Unit condensate line connected to the condensate system at a location which is:
　between a first of the serial low pressure heaters and a second of the serial low pressure heaters; and
　between a third of the serial low pressure heaters and a fourth of the serial low pressure heaters.

13. The coal fired Oxy boiler power plant of claim 1 wherein the CO2 capture system comprises:
　a Gas Processing Unit heat exchanger having a Gas Processing Unit condensate line connected to the condensate system at a location which is:
　upstream of a first of the serial low pressure heaters; and
　between a fourth of the serial low pressure heaters and the Feed Water Tank.

14. The coal fired Oxy boiler power plant of claim 1 wherein the CO2 capture system comprises:
　a Gas Processing Unit heat exchanger having a Gas Processing Unit condensate line connected to the condensate system at a location which is:
　upstream of a first of the serial low pressure heaters; and
　between a third of the serial low pressure heaters and a fourth of the serial low pressure heaters.

15. The coal fired Oxy boiler power plant of claim 1 wherein the CO2 capture system comprises:
　a Gas Processing Unit heat exchanger having a Gas Processing Unit condensate line connected to the condensate system at a location which is:
　upstream of a first of the serial low pressure heaters; and
　between a second of the serial low pressure heaters and a third of the serial low pressure heaters.

16. The coal fired Oxy boiler power plant of claim 10 further comprising:
　a condensate flow control valve, in the condensate system, located fluidly:
　parallel to the Air Separation Unit heat exchanger; and
　parallel to the Gas Processing Unit heat exchanger.

\* \* \* \* \*